(12) United States Patent
Augsberger et al.

(10) Patent No.: US 6,557,936 B1
(45) Date of Patent: May 6, 2003

(54) INTEGRATED CHILD SEAT FOR AN AUTOMOBILE SEAT

(75) Inventors: Norbert Augsberger, Hahnbach (DE); Gerhard Gebert, Wackersdorf (DE); Gerhard Delling, Schmidgaden (DE); Peter Kirchner, München (DE); Erwin Haller, Birgland (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 09/763,470

(22) PCT Filed: Jul. 29, 1999

(86) PCT No.: PCT/DE99/02337
§ 371 (c)(1),
(2), (4) Date: Feb. 15, 2001

(87) PCT Pub. No.: WO00/12349
PCT Pub. Date: Mar. 9, 2000

(30) Foreign Application Priority Data

Sep. 1, 1998 (DE) .......................... 198 39 673

(51) Int. Cl.$^7$ ................................................ B60N 2/42
(52) U.S. Cl. ............... 297/216.11; 297/255; 297/216.2; 296/68.1
(58) Field of Search ................................ 297/255, 256, 297/216.1, 216.11, 216.14, 216.15, 216.16, 216.18, 216.2, 250.1; 296/68.1, 65.05; 248/188.1, 188.6

(56) References Cited

U.S. PATENT DOCUMENTS

| | | | |
|---|---|---|---|
| 2,823,730 A | | 2/1958 | Lawrence |
| 4,440,441 A | | 4/1984 | Marrujo et al. ............. 297/216 |
| 5,152,578 A | * | 10/1992 | Kiguchi ................... 297/216.1 |
| 5,224,755 A | * | 7/1993 | Beroth ..................... 297/216.1 |
| 5,344,210 A | * | 9/1994 | Marwan et al. .......... 297/216.2 |
| 5,503,458 A | * | 4/1996 | Petrie ..................... 297/452.13 |
| 5,531,404 A | * | 7/1996 | Marechal ............ 297/216.1 X |
| 5,657,950 A | * | 8/1997 | Han et al. ................ 297/216.2 |

FOREIGN PATENT DOCUMENTS

| | | |
|---|---|---|
| DE | 4423218 | 12/1994 |
| EP | 538490 | 4/1993 |
| EP | 554807 | 8/1993 |
| FR | 2101129 | 3/1972 |

* cited by examiner

Primary Examiner—Peter M. Cuomo
Assistant Examiner—Stephen Vu
(74) Attorney, Agent, or Firm—Elliot M. Olstein; Raymond J. Lillie

(57) ABSTRACT

An integrated child's seat (10) is provided for a motor vehicle seat. The child's seat (10) is displaceable between a low and an unfolded raised position. It has a base portion (12) and a support portion (14) which are pivotably connected by front and rear parallelogram arm devices (16, 18). A diagonal strut device (40) is linearly movably guided with a guide end portion (42) along a guide device (44) provided on the support portion (14) or on the front parallelogram arm device (16). The diagonal strut device (40) is pivotably connected with its second end portion (52) to the rear parallelogram arm device (18) by a pivotal connection (58). The rear parallelogram arm device (18) has a weak crash location (38) so that in the unfolded condition of the child's seat (10) with a corresponding weight on the support portion (14), the rear parallelogram arm device (18) buckles at the weak crash location (38) and the support portion (14) dips downwardly with its rear end part.

6 Claims, 2 Drawing Sheets

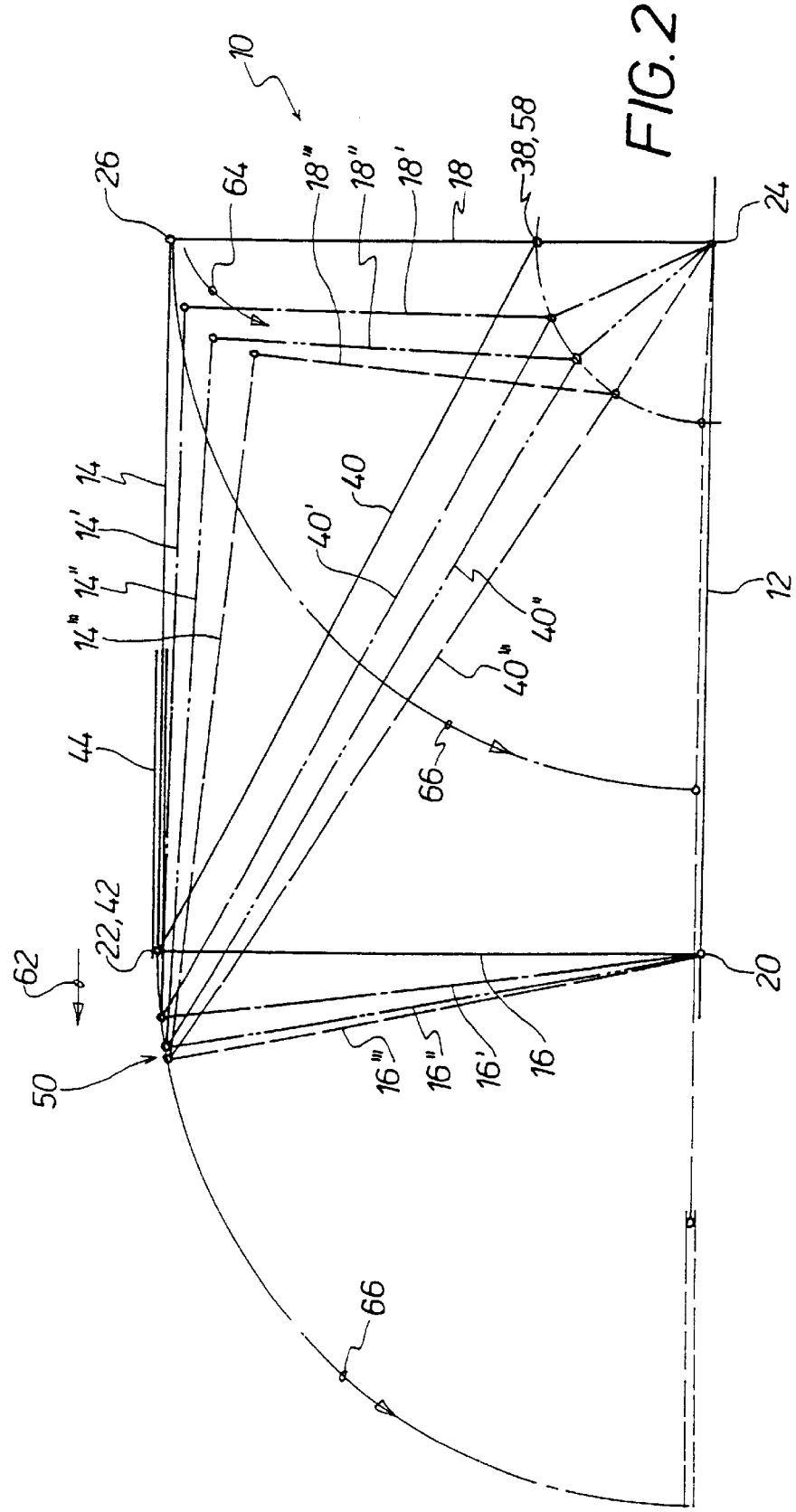

INTEGRATED CHILD SEAT FOR AN AUTOMOBILE SEAT

BACKGROUND OF THE INVENTION

1. Field of the Invention

The invention concerns an integrated child's seat for a motor vehicle seat, in particular for a motor vehicle seat in the rear region, wherein the child's seat is displaceable between a folded-in low position and an unfolded raised position, comprising a base portion and a support portion which are pivotably connected together by means of a front and a rear parallelogram arm device, a diagonal strut device which is linearly movably guided with a guide end portion along a guide device provided on the support portion or on the front parallelogram arm device, and a locking device for fixing the support portion in the raised position.

2. Discussion of Prior Art

An integrated child's seat of that kind is known from DE 44 23 218 A1. In that known child's seat the diagonal strut device can have an extensible region so that, in the event of a severe deceleration of the vehicle in which the child's seat is disposed, caused by an accident, the support portion moves forwardly, in particular because of the acceleration forces which act on the respective child sitting on the child's seat. Due to the extension of the diagonal strut device as a consequence of such accident-induced acceleration forces, the support portion of that known child's seat—with the seat cushioning provided thereon—will pivot forwardly further than normal, that is to say the depth of the seat becomes greater at the front. This means that a child sitting on the cushioning of the support portion of the child's seat is accelerated forwardly and downwardly, in the event of the vehicle suffering from severe deceleration due to an accident.

SUMMARY OF THE INVENTION

The object of the present invention is to provide an integrated child's seat of the kind set forth in the opening part of this specification, in which, in the event of acceleration caused by an accident, the support plate of the child's seat, which plate is loaded by the weight of a child, is not moved forwardly and downwardly but is moved downwardly, in particular at the rear, in order to cause so-to-speak a downward plunging movement at the rear of the child sitting on the child's seat.

In accordance with the invention, in an integrated child's seat of the kind set forth in the opening part of this specification, that object is attained in that the diagonal strut is pivotably connected with its second end portion which is remote from the guide end portion to the rear parallelogram arm device and that the rear parallelogram arm device has a weak crash location.

When the child's seat, that is to say the support portion which is provided with cushioning or upholstery of the child's seat according to the invention is in the raised, unfolded condition in which it is subjected to weight, the rear parallelogram arm device collapses or buckles in the event of a crash, that is to say with correspondingly high acceleration forces at the crash weak location, in which case the diagonal strut device which is fixed, that is to say held fast, by the locking device between the support portion and the front parallelogram arm device and consequently the support portion are displaced downwardly at the rear. The support portion therefore performs a limited movement forwardly and at the same time, with its rear part, a defined movement downwardly. A child sitting on the unfolded child's seat or the upholstered support portion is therefore not moved forwardly and downwardly but is moved rearwardly in a defined manner, virtually in the manner of a swing, in a downward direction, which is advantageous from points of view related to safety.

In the child's seat according to the invention, it has proven desirable if the pivotal connection of the diagonal strut device to the rear parallelogram arm device and the weak crash point of the rear parallelogram arm device are disposed in closely adjacent relationship or at least approximately axially align, because then, in the event of a crash in the unfolded raised position of the child's seat which is subjected to a weight loading or the upholstered support portion of the child's seat, the situation entails precisely defined bending and movement conditions in terms of the components of the child's seat, that is to say the parallelogram arm devices, the diagonal strut device and the support portion.

The parallelogram arm devices can be in the form of U-shaped profile elements with a base part and with limb elements which project away laterally from the base part. The U-shaped profile elements can be formed for example by suitably edged sheet metal stamped portions or by sheet metal flat elements which are welded together.

In a design configuration of the above-indicated kind, the limb elements of the rear parallelogram arm device can have openings which are disposed in coincident relationship with each other, to provide the weak crash location. It will be appreciated that the base part of the rear parallelogram arm device may also be provided with at least one suitably positioned opening to define the weak crash location.

In accordance with the invention the locking device with which the upholstered support portion is fixed in the unfolded raised position, for fixing the guide end portion of the diagonal strut device, can be provided in the transitional region between the support portion and the front parallelogram arm device or between the support portion and the front parallelogram arm device.

BRIEF DESCRIPTION OF THE DRAWINGS

Further details, features and advantages will be apparent from the description hereinafter of an embodiment, illustrated in the drawing, of essential details of the integrated child's seat according to the invention for a motor vehicle seat, in particular for a motor vehicle seat in the rear region of a motor vehicle. In the drawing:

FIG. 2 is a diagrammatic side view of various positions or configurations of the individual parts shown in the perspective view in FIG. 1 of the child's seat in a crash situation when a child is sitting on the child's seat.

DETAILED DESCRIPTION OF THE PREFERRED EMBODIMENT

Figure 1:
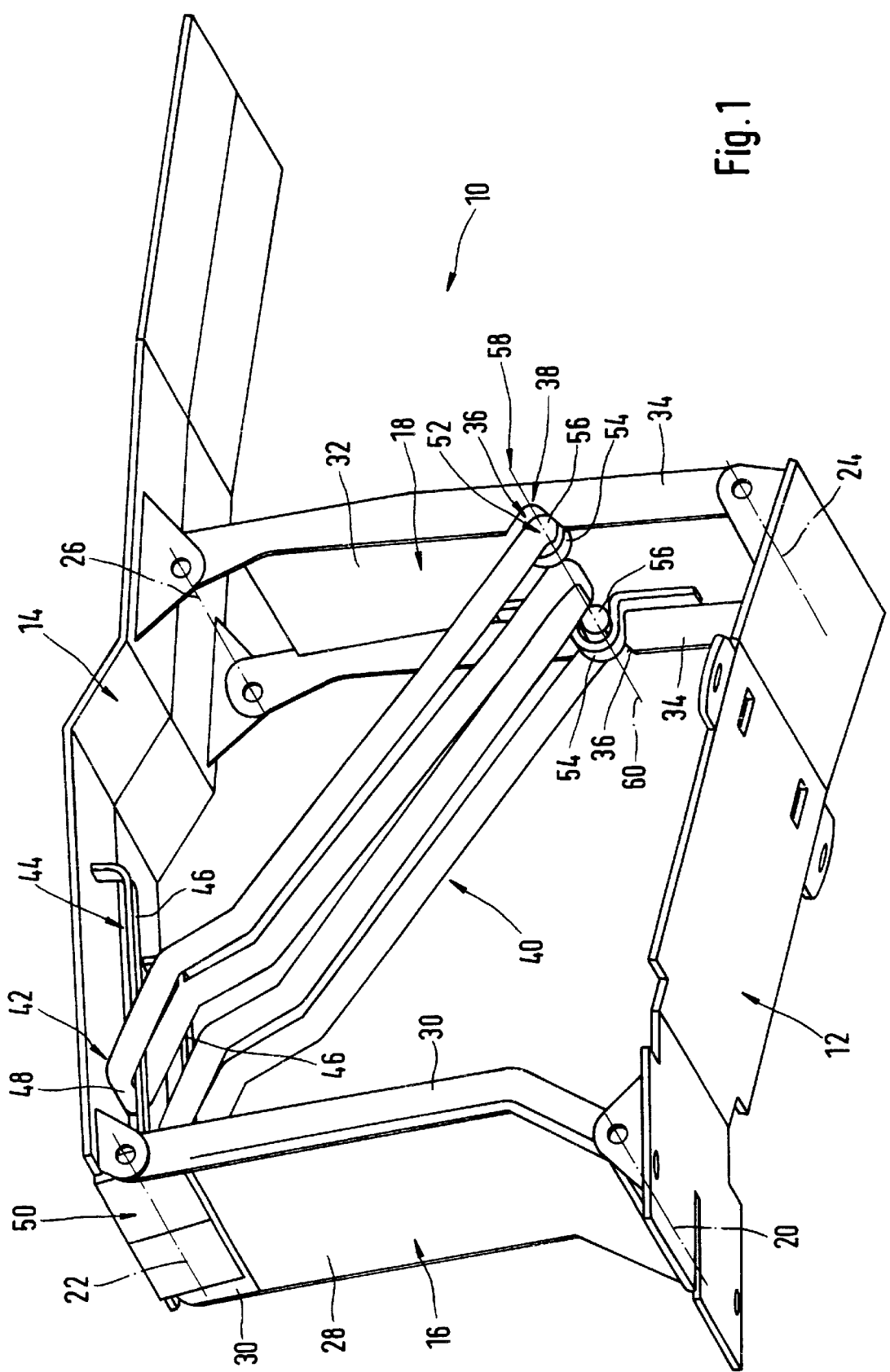
FIG. 1 is a perspective view of the essential details of an embodiment of the child's seat, without however showing the upholstery of the support portion.

FIG. 1 is a perspective view showing essential details of an integrated child's seat 10 for a motor vehicle seat, in particular for a motor vehicle seat in the back region of a vehicle. The child's seat 10 has a flat base portion 12 and a flat support portion 14 which are pivotably movably connected together by means of a front parallelogram arm device 16 and a rear parallelogram arm device 18, that is to say, they are pivotable between a folded-in or collapsed low position and an unfolded or extended raised position. For that purpose, the front parallelogram arm device 16 is connected by means of a pivot axis 20 to the base portion 12 and by means of a parallel pivot axis 22 parallel thereto to the support portion 14 and the rear parallelogram arm device 18 is pivotably connected by means of a pivot axis 24 parallel to the pivot axes 20 and 22 to the base portion 12 and by means of a pivot axis 26 parallel to the pivot axes 20, 22 and 24 to the support portion 14. The pivot axes 20, 22, 24 and 26 are only shown in FIG. 1 by means of their thin dash-dotted center lines.

The front parallelogram arm device 16 and the rear parallelogram arm device 18 are in the form of U-shaped profile elements. The front parallelogram arm device 16 has an angled base portion 28 and angled limb elements 30 which project laterally away from the base portion 28 in the same direction, and the rear parallelogram arm device 18 has a base portion 32 and two limb elements 34 which project laterally away from the base portion 32 in the same direction. The limb elements 34 of the rear parallelogram arm device 18 are provided with openings 36 which are in coincident relationship, as viewed from the side. The two openings 36 in the limb elements 34 of the rear parallelogram arm device 16 form a weak crash location 38 about which the rear parallelogram arm device 18 buckles when a child sitting on the child's seat 10 with the support portion 14 in the extended raised position is subjected to the effect of crash-induced forces which become operative at the weak crash location 38 by way of the extended raised support portion 14. That buckling effect is diagrammatically illustrated in FIG. 2, to which reference will be made in greater detail hereinafter.

The child's seat 10 also has a diagonal strut device 40 which, as can be seen from FIG. 1, can comprise for example a rod or bar of a suitable metal or a suitable metal alloy, being bent over several times through 180°. The diagonal strut device 40 is linearly movably guided with a guide end portion 42 along a guide device 44 provided on the support portion 14, in order to be able to displace or pivot the support portion 14 between a folded-in low position in which the support portion 14 is adjacent to the base portion 12 and an unfolded raised position in which the support portion 14 is at a suitable heightwise distance from the base portion 12. In the embodiment of the child's seat 10 shown in FIG. 1, the guide device 44 is formed by two rods or bars 46 which are fixed to the underside of the support portion 14 in such a way as to extend parallel to each other. At its guide end portion 42, the diagonal strut device 40 has two portions 48 which are bent in a U-shape and with which the rods or bars 46 of the guide 44 are embraced.

The support portion 14 is fixed in the unfolded raised position by a locking device 50. For that purpose, the locking device 50 can engage for example the support portion 14 or the guide end portion 42 of the diagonal strut device 40, in positively locking engagement therewith.

The diagonal strut device 40 has a second end portion 52 which is remote from the guide end portion 42 and which is pivotably connected to the rear parallelogram arm device 18. For that purpose, in the embodiment of the child's seat 10 shown in FIG. 1, two mounting loops 54 for example extend away from the flat base portion 32 of the rear parallelogram arm device 18. The two mutually facing angled ends 56 of the second end portion 52 of the diagonal strut device 40 extend into the two mounting loops 54. The mounting loops 54 are fixed to the base portion 32. The mounting loops 54 and the associated ends 56 of the diagonal strut device 40 thus form a pivotal connection 58 whose center line or pivot axis is shown by the dash-dotted line 60 (see FIG. 1). FIG. 1 also clearly shows that the pivotal connection 58 of the diagonal strut device 40 to the rear parallelogram arm device 18 and the weak crash location 38 are disposed in closely adjacent relationship or in at least approximately axial alignment.

FIG. 2 diagrammatically shows as a side view the essential individual parts of the child's seat 10—similarly to FIG. 1—comprising a base portion 12, the front parallelogram arm device 16, the rear parallelogram arm device 18, the support portion 14 and the diagonal strut device 40. The same details are denoted in FIG. 2 by the same references as in FIG. 1, and this applies also for example in regard to the pivot axis 20, the pivot axis 22, the pivot axis 24 and the pivot axis 26, and also the pivotal connection 58 between the diagonal strut device A 40 and the rear parallelogram arm device 18, and the weak crash location 38 at the rear parallelogram arm device 18 of the child's seat 10. Solid lines indicate the support portion 14, the front parallelogram arm device 16 and the rear parallelogram arm device 18 (see FIG. 2). Dash-dotted lines show the rear parallelogram arm device identified by reference 18' as well as the support portion identified by reference numeral 14' and the front parallelogram arm device identified by reference numeral 16', after a crash with a corresponding weight loading on the child's seat 10, in an intermediate position which is correspondingly angled about the crash weak location 38. Double-dot-dashed lines denote an intermediate position, with a greater degree of buckling, in respect of the rear parallelogram arm device identified by reference numeral 18", the support portion identified by reference numeral 14" and the front parallelogram arm device identified by reference numeral 16".

The rear parallelogram arm device 18 buckles about the weak crash location 38 only until its portion between the pivot axis 24 and the weak crash location 38 is aligned with the diagonal strut device 40, that is to say, it forms a straight line. That condition is shown in FIG. 2 by broken lines, wherein the front parallelogram arm device is identified by reference numeral 16''', the rear parallelogram arm device is identified by reference numeral 18''' and the support portion is identified by reference numeral 14'''.

FIG. 2 also shows that, in the unfolded raised condition of the child's seat 10, with a weight loading on the support portion 14 caused by the weight of a child sitting on the support portion or upholstery of the support portion 14, in the event of a crash and consequently upon buckling of the rear parallelogram arm device 18 at the weak crash location 38, the support portion 14 is moved forwardly with its front portion at a height which remains virtually the same, as is indicated by the arrow 62, and at the same time the rear part of the support portion 14 is moved in an arcuate path, both forwardly and also downwardly, as is illustrated by means of the arcuate arrow 64. The situation therefore involves so-to-speak a downward dipping movement of the support portion 14 at its rear, which is advantageous from safety points of view.

The movements of the front parallelogram arm device 16, the rear parallelogram arm device 18, the diagonal strut device 40 and the support portion 14, which are indicated in FIG. 2 by the solid lines, the dash-dotted lines, the double-dot-dashed lines and by the broken lines, are possible only when the support portion 14 is fixed in the raised position by means of the locking device 50 (see FIG. 1). When the locking device 50 is released, the support portion 14 can be displaced forwardly about the pivot axes 20 and 24 into a folded-in or retracted low position, as is indicated in FIG. 2 by the arcuate arrow lines 66 which are concentric with the pivot axes 20 and 24. Reference numeral 44 also identified in FIG. 2 the guide device provided on the support portion 14 for the guide end portion 42 of the diagonal strut device 40.

What is claimed is:

1. An integrated child's seat for a motor vehicle seat wherein said child's seat (10) is displaceable between a folded-in low position, and an unfolded raised position for supporting a child, comprising a base portion (12) and a support portion (14) which are connected pivotably by means of a front parallelogram arm device (16), and a rear parallelogram arm device (18), a diagonal strut device (40) having a guide end portion (42) and a second end portion (52), in which said diagonal strut device (40) is linearly movably guided along a guide device (44) attached to one of the support portion (14) and the front parallelogram arm device (16), and a locking device (50) for fixing the support portion (14) in the unfolded raised position for supporting a child, wherein the diagonal strut device (40) is connected pivotably with said second end portion (52), which is remote from the guide end portion (42), to said rear parallelogram device (18), and said rear parallelogram arm device (18) includes a weak crash location (38), and wherein said front and rear parallelogram arm devices (16;18) are in the form of U-shaped profile elements, wherein each said U-shaped profile element includes a base portion (28;32) and limb elements (30;34) which project laterally away from said base portion (28;32).

2. The integrated child's seat of claim 1 wherein said limb elements (34) of said rear parallelogram arm device (18) have openings (36) which are disposed in mutually convenient relationship to provide said weak crash location (38).

3. An integrated child's seat for a motor vehicle seat, wherein said child's seat (10) is displaceable between a folded-in low position, and an unfolded raised position for supporting a child, comprising a base portion (12) and a support portion (14) which are connected pivotably by means of a front parallelogram arm device (16) and a rear parallelogram arm device (18), a diagonal strut device (40) having a guide end portion (42) and a second end portion (52), in which said diagonal strut device (40) is linearly movably guided along a guide device (44) attached to one of the support portions (14) and the front parallelogram arm device (16), and a locking device (50) for fixing the support portion (14) in the unfolded raised position for supporting a child, wherein the diagonal strut device (40) is pivotably connected with said second end portion (52), which is remote from the guide end portion (42) to said rear parallelogram device (18), and said rear parallelogram arm device (18) includes a weak crash location (38), and a pivotal connection (58) connecting said diagonal strut device (40) to the rear parallelogram arm device (18) and where the pivotal connection (58) connecting the diagonal strut device (40) to the rear parallelogram arm device (18) and the weak crash location (38) are adjacent, and wherein said front and rear parallelogram arm devices (16;18) are in the form of U-shaped profile elements, wherein each said U-shaped profile element includes a base portion (28;32) and limb elements (30;34) which project laterally away from said base portion.

4. The integrated child's seat of claim 3 wherein said limb elements (34) of said rear parallelogram arm device (18) have openings (36) which are disposed in mutually coincident relationship to provide said weak crash location (38).

5. An integrated child's seat for a motor vehicle seat, wherein said child's seat (10) is displaceable between a folded-in low position and an unfolded raised position for supporting a child, comprising a base portion (12) and a support portion (14) which are connected pivotably by means of a front parallelogram arm device (16) and a rear parallelogram arm device (18), a diagonal strut device (40) having a guide end portion (42) and a second end portion (52), in which said diagonal strut device (40) is linearly movably guided along a guide device (44) attached to one of the support portion (14) and the front parallelogram arm device (16), and a locking device (50) for fixing the support portion (14) in the unfolded raised position for supporting a child, wherein the diagonal strut device (40) is connected pivotably with said second end portion (52), which is remote from the guide end portion (42) to said rear parallelogram arm device (18), and said rear parallelogram arm device (18) includes a crash weak location (38), and a pivotal connection (58) connecting said diagonal strut device (40) to the rear parallelogram arm device (18), and wherein the pivotal connection (58) connecting the diagonal strut device (40) to the rear parallelogram arm device (18) and the weak crash location (38) are at least approximately aligned, and wherein said front and rear parallelogram arm devices (16,18) are in the form of U-shaped profile elements, wherein each said profile element includes a base portion (28,32) and limb elements (30;34) which project laterally away from said base portion (28,32).

6. The integrated child's seat of claim 5 wherein said elements (34) of said rear parallelogram arm device (18) have openings (36) which are disposed and mutually coincident to provide said weak crash location (38).

* * * * *